United States Patent
Dequen et al.

(10) Patent No.: US 10,673,633 B2
(45) Date of Patent: Jun. 2, 2020

(54) HASHED DATA RETRIEVAL METHOD

(71) Applicants: UNIVERSITE DE REIMS CHAMPAGNE-ARDENNE, Reims (FR); UNIVERSITE DE PICARDIE JULES VERNE, Amiens (FR)

(72) Inventors: Gilles Dequen, Amiens (FR); Florian Legendre, Fismes (FR); Michaël Krajecki, Reims (FR)

(73) Assignees: UNIVERSITE DE REIMS CHAMPAGNE-ARDENNE, Reims (FR); UNIVERSITE DE PICARDIE JULES VERNE, Amiens (FR)

( * ) Notice: Subject to any disclaimer, the term of this patent is extended or adjusted under 35 U.S.C. 154(b) by 134 days.

(21) Appl. No.: 15/562,533

(22) PCT Filed: Mar. 23, 2016

(86) PCT No.: PCT/EP2016/056420
§ 371 (c)(1),
(2) Date: Sep. 28, 2017

(87) PCT Pub. No.: WO2016/156156
PCT Pub. Date: Oct. 6, 2016

(65) Prior Publication Data
US 2018/0115427 A1 Apr. 26, 2018

(30) Foreign Application Priority Data
Mar. 31, 2015 (EP) .................................... 15305475

(51) Int. Cl.
*H04L 9/32* (2006.01)
*H04L 9/08* (2006.01)
(Continued)

(52) U.S. Cl.
CPC ............ *H04L 9/3239* (2013.01); *G06F 21/31* (2013.01); *H04L 9/0637* (2013.01);
(Continued)

(58) Field of Classification Search
CPC ................................................ G06F 2221/2131
See application file for complete search history.

(56) References Cited

U.S. PATENT DOCUMENTS

| | | | |
|---|---|---|---|
| 7,809,130 B1 | 10/2010 | Kalyadin et al. | |
| 2008/0016333 A1* | 1/2008 | Cao | G06F 21/34 713/155 |

(Continued)

OTHER PUBLICATIONS

Mironov, Ilya, and Lintao Zhang. "Applications of SAT solvers to cryptanalysis of hash functions." International Conference on Theory and Applications of Satisfiability Testing. Springer, Berlin, Heidelberg, 2006. (Year: 2006).*

(Continued)

*Primary Examiner* — Madhuri R Herzog
(74) *Attorney, Agent, or Firm* — Cooper Legal Group, LLC; Ronald M. Kachmarik

(57) ABSTRACT

Method for retrieving data entered during a server connection, the server having access to a memory including a generated hashed word of a first input data, which corresponds to the data modified by a processing function, the capacity of the hashed word being lower than a predefined capacity, a generated security key of a second input data, which corresponds to the data modified by a processing function, the capacity of the security key being equal to the difference between the predefined capacity and the hashed word capacity, the security key not being stored, method wherein: —after a request to retrieve the data, the hashed word and the security key are concatenated in order to reach the predefined capacity, and —an inverse hash function, (Continued)

using an algebraic solving of the hash function, is applied to the concatenation of the hashed word and security key, to retrieve the data.

15 Claims, 6 Drawing Sheets

(51) Int. Cl.
  *H04L 9/06* (2006.01)
  *H04L 29/06* (2006.01)
  *G06F 21/31* (2013.01)
  *H04L 9/14* (2006.01)

(52) U.S. Cl.
  CPC .......... *H04L 9/0643* (2013.01); *H04L 9/0861* (2013.01); *H04L 9/0863* (2013.01); *H04L 9/14* (2013.01); *H04L 9/3226* (2013.01); *H04L 9/3242* (2013.01); *H04L 63/083* (2013.01); *G06F 2221/2131* (2013.01); *H04L 63/0823* (2013.01)

(56) References Cited

U.S. PATENT DOCUMENTS

| 2008/0172560 | A1* | 7/2008 | Hughes | H04L 9/3236 713/176 |
|---|---|---|---|---|
| 2010/0293600 | A1 | 11/2010 | Schechter et al. | |

OTHER PUBLICATIONS

Kamal, Abdel Alim, and Amr M. Youssef. "Applications of SAT solvers to AES key recovery from decayed key schedule images." 2010 Fourth International Conference on Emerging Security Information, Systems and Technologies. IEEE, 2010. (Year: 2010).*

Lafitte, Frëdëric, Jorge Nakahara Jr, and Dirk Van Heule. "Applications of SAT solvers in cryptanalysis: finding weak keys and preimages." Journal on Satisfiability, Boolean Modeling and Computation 9 (2014): 1-25. (Year: 2014).*

Corresponding International application, application No. PCT/EP2016/056420, International Search Report dated Jun. 21, 2016 3 pages.

Guido Bertoni et al: "The Keccak reference" Jan. 14, 2011 (Jan. 14, 2011). XP055115606. Retrieved from the Internet: URL:http://keccak.noekeon.org/Keccak-reference-3.0.pdf [retrieved on Apr. 28, 2014]; cited in the application paragraph [0001] paragraph [02. 3] paragraph [04 .1] paragraph [0005].

Florian Legendre et al: "Logical Reasoning to Detect Weaknesses About SHA-1 and MD4/5 1" International Association for Cryptologic Research, vol. 20140415:065209, Apr. 4, 2014 (Apr. 4, 2014). pp. 1-39, XP061015803 paragraph [0002]—paragraph [0003].

Pawel Morawi Ecki et al: "A SAT-based preimage analysis of reduced Keccak hash functions", International Association for Cryptologic Research, vol. 20101019:140641, Oct. 19, 2010 (Oct. 19, 2010). pp. 1-12, XP061004279. cited in the application, paragraph [0002], paragraph [0004].

* cited by examiner

State of the Art

State of the Art

HASHED DATA RETRIEVAL METHOD

The present invention relates to methods for retrieving data hashed by a cryptographic hash function.

Democratization and growth of expanding high-performance digital technologies and of the Internet have considerably changed the world of communication. Needs to preserve trade protection are thus numerous. This can be commonly achieved thanks to secure protocols and hence using cryptographic mechanisms.

When a system needs to identify a client, as for instance for a bank trade, a connection to a website or a system authentication, the main constraint remains focused on the authentication problem, the client having to confirm his identity to the system in order that the latter is sure of the identity of the client. To ensure this constraint, such systems require the use of cryptographic primitives.

Classically, when an authentication protocol is applied, a client has previously registered an account on a server of the system, preferably information comprising a login ID and a password, the login ID being for example an account name, an e-mail address or a unique identifier, as shown in FIG. 1A. The server can identify the client because the server knows the password. The password is generally not kept as a clear text on the server. The registration phase includes a cryptographic hashing computation F of the password in order to obtain an associated fingerprint, also named digest, message-digest or hashed data. Thanks to the properties of cryptographic hash functions, this digest is a fixed-size bit string that allows identifying a data without accessing to its contents. This digest is stored on the server and then used to check data integrity each time a password is entered, as shown in FIG. 1B.

Well-known cryptographic hash functions are MD5 and SHA-0/1 functions, respectively described in the reference documents RFC-1321 and RFC-6194 ("*Request For Command*"). In the last past years, some theoretical cryptographic weaknesses have been discovered and the MD5 and SHA-0/1 functions are not often used anymore. The SHA-2 function has a construction scheme very closed to the one of MD5 and SHA-0/1 functions, and thus has possible security weaknesses. A brand new hash function, named SHA-3 and based on a very different construction scheme, has been chosen by the governmental organism NIST ("National Institute of Standards and Technology") in October 2012.

However, authentication protocols rely on a trade-off between the strength of a password and the capacity of a person to keep it secret, as explained in the article of Robert Morris and Ken Thompson, "*Password security—a case history*" in Communications of the ACM, 22(11): 594-597, 1979. Generally, either the password is weak or the client risks forgetting or losing it. If this latter case occurs, two solutions are proposed to the client: a Password Recovery (PR) system to retrieve the original password, or a Self-Service Password Reset (SSPR) in order to get a new password.

Both PR and SSPR systems could be implemented thanks to many approaches, as for instance the use of authentication tokens, as described in the article of Robert J. Zuccherato. "*Authentication token*" in Encyclopedia of Cryptography and Security (2nd Ed.), pages 62-63, Springer, 2011, of client-server method, as described in the article of Lukasz et al. "*Client-server password recovery*", in OTM Conferences 2, pages 861-878, 2009, of biometrics, as explained in the article of Bernd Hohgrfe and Sebastian Jacobi "*Voice biometrics as a way to self-service password reset*", in Norbert Pohlmann, Helmut Reimer, and Wolfgang Schneider, editors, ISSE 2009 Securing Electronic Business Processes, pages 137-144, Vieweg+Teubner, 2010, or by answering personal questions. This latter method, also named knowledge-based authentication, is often privileged, however it presents security flaws, especially because of social networking which makes it a lot easier to work out somebody's personal questions, and because of the hacking of databases which can lead to selling the information, as shown in the articles of Lawrence O'Gorman, et al. "*Call center customer verification by query-directed passwords*" in Financial Cryptography, pages 54-67, 2004, of Ariel Rabkin "*Personal knowledge questions for fallback authentication: security questions in the era of Facebook*", in SOUPS, pages 13-23, 2008, of Markus Jakobsson et al. "*Love and authentication*", in CHI 08: Proceeding of the twenty-sixth annual SIGCHI conference on Human factors in computing systems, pages 197-200, ACM, 2008, and of Joseph Bonneau et al. "*What's in a name?*", in Financial Cryptography, pages 98-113, 2010.

A known technique allowing resetting or retrieving a lost password consists in e-mailing the client to give him the password. Such an e-mail contains very sensitive information and can be intercepted by a hacker if the connection is unsecured, or, if the mailbox is broken.

Another technique consists in e-mailing the client to give him a temporary password. Such a temporary password is as sensitive as the original password except that it is created for a short lifetime. However, if the connection is unsecured, a hacker can get this password by intercepting the e-mail, or an attacker can view the temporary password in a broken mailbox and access to the retrieval procedure.

Alternatively, instructions on how to reset the password can be e-mailed to the client. Such instructions are as sensitive as a temporary password and an attacker can intercept them through an unsecured connection, especially by accessing to the client's mailbox.

All of these methods based on sending sensitive information by e-mail are also weak because the e-mails are kept in the client's mailbox and thus the security of the data relies on the security of the mailbox.

As already mentioned, displaying the password after answering questions is risky because questions are often weak and can be answered by an attacker.

Displaying the password after a client's phone checking, by sending a code in a text message for example, is also used. This code can be intercepted by an attacker if the transmission is not secured or if the phone is corrupted. Besides, the code is often short and weak, and thus likely to be tackled by a brute force attack.

Another possible technique consists in providing a password hint to help the client. It could also help an attacker, and this technique encourages weak passwords that are easy to remember thanks to a little indication.

A summary of the general framework for the retrieval of a lost password is presented in FIG. 2. During a first connection to a server, at a step 51, a client registers by entering a login and an associated password. The latter is encrypted and stored, at a step 52, in a memory 61 to which the server has access. If the client forgets his password, he can make a request of password retrieval to the server, as shown at step 53. To do so, at a step 54, the password is taken back from the memory 61 in order to be given to the client after a password recovery protocol implemented at step 55, as previously explained, for example by asking personal questions to the client, or by sending a code, or an e-mail comprising the original password, a temporary password or instructions to create a new password.

These considerations can be extended to any data to be preserved, other than a password.

There is thus a need to improve the recovery of a data to be preserved, in order to offer better guarantees of confidentiality to both a client and a server.

One object of the invention, according to a first of its aspects, is a method for retrieving a data to be preserved, entered by a client during a previous connection to a server, the server having access to a memory comprising a hashed word generated by applying a hash function to a first input data of a predefined capacity, the first input data corresponding to the data to be preserved modified by a processing function, the capacity of the hashed word being lower than said predefined capacity, a security key of the client having been generated by applying a hash function to a second input data of a predefined capacity, the second input data corresponding to the data to be preserved modified by a processing function, the capacity of the security key being equal to the difference between said predefined capacity and the capacity of the hashed word, the security key not being stored on the memory to which the server has access, method wherein:

after a request of the client to retrieve the data to be preserved, the hashed word and the security key are concatenated in order to reach said predefined capacity, and an inverse hash function, using an algebraic solving of the hash function having generated the hashed word, is applied to the concatenation of said hashed word and security key, in order to retrieve the data to be preserved.

The invention provides a simple method for retrieving a data to be preserved, which does not need to store in anyway the input data or to reveal sensitive information. This allows both the client and the server to only trust themselves.

The concatenation of the hashed word and the security key is essential to retrieve the data to be preserved. Any malicious attacker thus needs to put together these two informations.

The memory of the server only stores the hashed word corresponding to the data to be preserved entered by the client. The server has no access to a clear or encoded track of the data. The data to be preserved by the client cannot thus be stolen from the server.

Besides, in a similar way, the client does not store the data or any sensitive information. No direct malignancy towards the client can lead to the corruption of the data to be preserved. The client only has access to the security key, also named «backhash information», which is of the same type as the hashed word kept by the server. It is almost impossible to obtain the data from this only information. The method of the invention may act as if the server is a key to the client, and the client is a key to the server. Both the server and the client possess decisive information for each other.

The lost data is never sent directly to the client, in an e-mail for example, as in the known methods. This allows avoiding security failures due to hacking of mailboxes.

In the case where the data to be preserved is a password for the authentication of the client on the server, the latter is able to authenticate the client thanks to the hashed word. The security key is, moreover, of no use for the authentication.

In the present invention, "capacity" has to be understood as the number of bits of a bit string.

Cryptographic Hash Functions

In a known manner, a cryptographic hash function F computes a hashed word h from an input data m: h=F(m). To one input data m, corresponds only one hashed word h.

No recognizable link exists between the input data m and the hashed word h. Cryptographic hash functions are advantageously non-bijective. Finding a data m by knowing h and doing the inverse operation $F^{-1}(h)$ is nearly impossible. This ensures the high security of hash functions.

A registering/authentication protocol using hash functions may comprise a first step of registration: the password Mclient of the client is hashed and only the hashed word Hclient=F(Mclient) is stored by the server. Then, when the client needs to be authenticated on the server, he enters a sequence M'client. The server computes H'client=F(M'client). If H'client is equal to Hclient, the server authentifies the client and rejects him otherwise.

To ensure hash functions are secured, they required being theoretically and computationally collision, preimage and second-preimage resistant.

A collision is when one can find two messages m and m' such as F(m)=F(m'). This attack is the easiest way to weaken a hash function and supply many tremendous results, as explained in the articles of Xiaoyun Wang "*Collisions for hash functions MD4, MD5, haval-128 and ripeMD*", in Crypto'04, page 199, 1997, of Xiaoyun Wang and Hongbo Yu "*How to break MD5 and other hash functions*", in EUROCRYPT, pages 19-35, 2005, of Hongbo Yu and Xiaoyun Wang, "*Multi-collision attack on the compression functions of MD4 and 3-pass haval*", in ICISC, pages 206-226, 2007, of Christophe De Cannière et al. "*Collisions for 70-step SHA-1: On the full cost of collision search*", in Selected Areas in Cryptography, pages 56-73, 2007, of Somitra Kumar Sanadhya and Palash Sarkar, "*New collision attacks against up to 24-step SHA-2*", in INDOCRYPT, pages 91-103, 2008, and of Marc Stevens et al. "*Chosen-prefix collisions for MD5 and applications*", IJACT, 2(4): 322-359, 2012.

A preimage attack consists in, given a hash function F and a hashed word h, finding a message m such as F(m)=h.

SHA-3

The hash function is preferably a SHA-3 hash function, especially using the Keccak algorithm. The invention may however be adapted to any cryptographic hash function.

The SHA-3 hash function, using the Keccak algorithm, belongs to the family of sponge functions, that is to say functions that take as input an any-size data and deliver a fixed-size word, as explained in the articles of Guido Bertoni et al. "*Sponge functions*", in Ecrypt Hash Workshop 2007, "*The keccak reference*", January 2011, and "Keccak", in EUROCRYPT, pages 313-314, 2013. The bit string used for being concatenated with the input data in order to reach the capacity of the SHA-3 permutation needed to compute a hashed word with the desired final capacity is named the sponge. Sponge functions advantageously incorporates a one-way compression function, which consists, within the framework of Keccak, in considering a fixed-size word of the shortened final state. More generally, a one-way compression function is a function that transforms two fixed-length inputs into a fixed-length output. This type of mechanism is a part of the classical Merkel-Damgard construction. Thus, each cryptographic hash function is consequently correlated to a one-way compression function.

The Keccak algorithm may be implemented from 12 to 24 rounds, with an internal state capacity equal to 200, 400, 800 or 1600.

In SHA-3, a trade-off between the values of the bitrate $r_b$ and the capacity c of the sponge determines the security of the hash function against preimage and collision attacks. The internal state capacity of the SHA-3 permutation is defined by the sum of the bitrate $r_b$ and the capacity c of the sponge.

The SHA-3 permutation has for example an internal state capacity of 1600 bits, including 64-bit words for internal states, corresponding to the predefined capacity $C_p = r_b + c$, with $r_b = 576$ and $c = 1024$, as illustrated in FIG. 3 for a Data sequence, concatenated with one or several bits, named "padding" word, in order to reach the bitrate $r_b$. The complete permutation function advantageously consists in 24 rounds of 5 sub-functions, containing only operations limited to bitwise XOR, bitwise AND, operator NOT and Modulo. A detailed description of a single round, with 64-bit words for internal states, may be:

---

Require:
    64-bit words for internal states
    25 internal states at the beginning of the Round (i.e. [plaintext || padding || ISC]
  at the first round)
      for xx in {00, ..., 24} and for i in {0, ..., 63}. Denoted $M_{xx}[i]$
    25 internal states at the end of the round (i.e. [digest || FSC] at the final round)
      for xx in {00, ..., 24} and for i in {0, ..., 63}. Denoted $M_{xx}^+[i]$
    25 intermediate states of the round
      for xx in {00, ..., 24} and for i in {0, ..., 63}. Denoted $T_{xx}[i]$
    24 rounds at most (one round described here)
    24 Iota Constants 64-bits words (denoted $X_{[r]}$ where 'r' is the round number):
      (note: big endiannesa notation)
X[00]: 0x0000000000000001, X[01]: 0x0000000000008082, X[02]: 0x800000000000808A, X[03]: 0x8000000080008000,
X[04]: 0x000000000000808B, X[05]: 0x0000000080000001, X[06]: 0x8000000080008081, X[07]: 0x8000000000008009,
X[08]: 0x000000000000008A, X[09]: 0x0000000000000088, X[10]: 0x0000000080008009, X[11]: 0x000000008000000A,
X[12]: 0x000000008000808B, X[13]: 0x800000000000008B, X[14]: 0x8000000000008089, X[15]: 0x8000000000008003,
X[16]: 0x8000000000008002, X[17]: 0x8000000000000080, X[18]: 0x000000000000800A, X[19]: 0x800000008000000A,
X[20]: 0x8000000080008081, X[21]: 0x8000000000008080, X[22]: 0x0000000080000001, X[23]: 0x8000000080008008
    XOR gate is $\oplus$
    Not x is $\bar{x}$
    AND gate is $\wedge$
    OR Gate is $\vee$
    Modulo is %

---

|      | Internal State Matrix Indexes (Denoted ISM) | Middle State Matrix Indexes. (Denoted MSM) | Middle State Shifting offsets. (Denoted MSS) |
|------|---------------------------------------------|--------------------------------------------|----------------------------------------------|
| [00] | [0,4,9,14,19,24,1,6,11,16,21]              | [0,6,12]                                   | [0,44,43]                                    |
| [01] | [1,0,5,10,15,20,2,7,12,17,22]              | [6,12,18]                                  | [44,43,21]                                   |
| [02] | [2,1,6,11,16,21,3,8,13,18,23]              | [12,18,24]                                 | [43,21,14]                                   |
| [03] | [3,2,7,12,17,22,4,9,14,19,24]              | [18,24,0]                                  | [21,14,0]                                    |
| [04] | [4,3,8,13,18,23,0,5,10,15,20]              | [24,0,6]                                   | [14,0,44]                                    |
| [05] | [5,4,9,14,19,24,1,6,11,16,21]              | [3,9,10]                                   | [28,20,3]                                    |
| [06] | [6,0,5,10,15,20,2,7,12,17,22]              | [9,10,16]                                  | [20,3,45]                                    |
| [07] | [7,1,6,11,16,21,3,8,13,18,23]              | [10,16,22]                                 | [3,45,61]                                    |
| [08] | [8,2,7,12,17,22,4,9,14,19,24]              | [16,22,3]                                  | [45,61,28]                                   |
| [09] | [9,3,8,13,18,23,0,5,10,15,20]              | [22,3,9]                                   | [61,28,20]                                   |
| [10] | [10,4,9,14,19,24,1,6,11,16,21]             | [1,7,13]                                   | [1,6,25]                                     |
| [11] | [11,0,5,10,15,20,2,7,12,17,22]             | [7,13,19]                                  | [6,25,8]                                     |
| [12] | [12,1,6,11,16,21,3,8,13,18,21]             | [13,19,20]                                 | [25,8,18]                                    |
| [13] | [13,2,7,12,17,22,4,9,14,19,24]             | [19,20,1]                                  | [8,18,1]                                     |
| [14] | [14,3,8,13,18,23,0,5,10,15,20]             | [20,1,7]                                   | [18,1,6]                                     |
| [15] | [15,4,9,14,19,24,1,6,11,16,21]             | [4,5,11]                                   | [27,36,10]                                   |
| [16] | [16,0,5,10,15,20,2,7,12,17,22]             | [5,11,17]                                  | [36,10,15]                                   |
| [17] | [17,1,6,11,16,21,3,8,13,18,23]             | [11,17,23]                                 | [10,15,56]                                   |
| [18] | [18,2,7,12,17,22,4,9,14,19,24]             | [17,23,4]                                  | [15,56,27]                                   |
| [19] | [19,3,8,13,18,23,0,5,10,15,20]             | [23,4,5]                                   | [56,27,36]                                   |
| [20] | [20,4,9,14,19,24,1,6,11,16,21]             | [2,8,14]                                   | [62,55,39]                                   |
| [21] | [21,0,5,10,15,20,2,7,12,17,22]             | [8,14,15]                                  | [55,39,41]                                   |
| [22] | [22,1,6,11,16,21,3,8,13,18,23]             | [14,15,21]                                 | [39,41,2]                                    |
| [23] | [23,2,7,12,17,22,4,9,14,19,24]             | [15,21,2]                                  | [41,2,62]                                    |
| [24] | [24,3,8,13,18,23,0,5,10,15,20]             | [21,2,8]                                   | [2,62,55]                                    |

STEP 1: Compute intermediate internal state $T_{xx}[i]$ $$\forall i \in [0, 63], \forall xx \in [0, 24], T_{xx}[i] = \bigoplus_{j=0}^{5} M_{ISM[xx][j]}[i] \oplus \bigoplus_{j=6}^{10} M_{ISM[xx][j]}[(i-1)\%64]$$

STEP 2: Compute internal states at the end of the round $M_{xx}^+[i]$
$\forall i \in [0,63], M_{00}^+[i] = T_0[i] \oplus (\overline{T_6[(i-44)\%64]} \wedge T_{12}[(i-43)\%64]) \oplus X_r$
$\forall i \in [0,63], \forall xx \in [1,24]\ M_{xx}^+[i] = T_{A_0}[(i-B_0)\%64] \oplus (\overline{T_{A_1}[(i-B_1)\%64]} \wedge T_{A_2}[(i-B_2)\%64])$
where $A_y$ = MSM [xx][y] and $B_y$ = MSS [xx][y]

At the end of the final round, only the first n bits of the internal state are considered as the digest, this number of bits n depending on the bitrate $r_b$ and the capacity c of the sponge, n being equal for example to 512 in the case where $r_b$=576 and c=1024. A particularity of SHA-3 is that the hash function is easily invertible from an internal state if all the bits are known, thanks to any procedure of polynomial complexity.

Algebraic Solving of Cryptographic Hash Functions

The algebraic solving of the hash function having generated the hashed word allows inverting said hash function and retrieving the original data. This can be done thanks to a Boolean encoding of the hash function primitive and a dedicated or generic algebraic solver.

The algebraic solving of the hash function is advantageously a Boolean SATisfiability (SAT) solving. This type of constraint-problem solving is a well-known NP-complete problem, as described in the articles of A. Biere et al. "*Handbook of Satisfiability*", volume 185 of Frontiers in Artificial Intelligence and Applications, IOS Press, February 2009, and of Stephen A. Cook "*The complexity of theorem proving procedures*", in ACM Symposium on Theory of Computing, pages 151-158, 1971.

SATisfiability solving consists in determining if a Boolean expression F has at least one assignment of truth value {TRUE, FALSE}, also named an interpretation, to its variable so that it is true. F is preferably considered as a CNF-formula ("Conjunctive Normal Form") which can be defined as a set of clauses, interpreted as a conjunction, where a clause is a set of literals, interpreted as a disjunction.

More precisely, let $v = \{v_1, \ldots, v_n\}$ be a set of n Boolean variables. A signed Boolean variable is named a literal. One can denote $v_i$ and $\overline{v_i}$ the positive and negative literals referring to the variable $v_i$ respectively. The literal $v_i$, respectively $\overline{v_i}$, is TRUE, also said "satisfied", if the corresponding variable $v_i$ is assigned to TRUE, respectively FALSE. Literals are commonly associated with logical AND and OR operators, respectively denoted by $\wedge$ and $\vee$. A disjunction of literals is for instance denoted by $v_1 \vee \overline{v_2} \vee v_3 \vee v_4$.

A clause is generally satisfied if at least one of its literals is satisfied, the expression F being satisfied if all its clauses are satisfied. In other words, if its exists an assignment of V on {TRUE, FALSE} such as to make the expression F TRUE, F is said SAT, and UNSAT otherwise.

Logical cryptanalysis consists in a two-step process using a modelling associated to an algebraic solving to model and. This can lead to the attack of a crypto-system, as explained in the articles of Fabio Massacci "*Using walk-SAT and rel-sat for cryptographic key search*", in IJCAI, pages 290-295, 1999, and of Fabio Massacci and Laura Marraro "*Logical cryptanalysis as a SAT problem*", J. Autom. Reasoning, pages 165-203, 2000, in the three articles of Florian Legendre et al. "*Encoding hash functions as a SAT problem*", in ICTAI, pages 916-921, 2012, "*Inverting thanks to SAT solving—an application on reduced-step MD\**", in SECRYPT, pages 339-344, 2012, and "*From a logical approach to internal states of hash functions—how SAT problem can help to understand SHA-\* and MD\**"; in SECRYPT, 2013, and in the Master thesis of Vegard Nossum "*SAT-based preimage attacks on SHA-1*", 2012.

The article of Ilya Mironov and Lintao Zhang "*Applications of SAT solvers to cryptanalysis of hash functions*", in SAT, pages 102-115, 2006, presents an interesting result on applying logical cryptanalysis to cryptographic hash functions. In this article, the authors assume that the runtime of a cryptanalytic attack should be improved by using a logic formalism to express complex operations. They model a whole differential path for the well-known hash functions MD* and SHA-*, into a Boolean circuit and obtain conclusive results by using some of well-known SAT solvers.

SATisfiability Solving of SHA-3

Modeling a hash function as a SAT formula may be realized thanks to automatic tools, as for instance CryptLogVer described in the article of Pawel Morawiecki and Marian Srebrny "*A SAT-based preimage analysis of reduced Keccak hash functions*", in Inf. Process. Letters, 113(10-11): 392-397, 2013, or by a handmade approach. Using a handmade approach allows obtaining an optimized resulting modeling, in terms of number of clauses and variables involved.

Encoding the SHA-3 hash function as a SAT formula advantageously requires considering each bit of each word involved into the original primitive as a variable. Each internal operation, also corresponding to a logical circuit, is associated to a set of clauses.

A direct SATisfiability solving of the Keccak hash function for a single round, with 64-bit words for internal states, may be expressed as:

$$\forall i \in [0, 63] \bigwedge_{xx=0}^{24} \left( \bigoplus_{j=0}^{6} M_{ISM[xx][j]}[i] \oplus \bigoplus_{j=6}^{10} M_{ISM[xx][j]}[(i-1)\%64] \oplus \overline{T_{xx}[i]} \right)$$

$$\forall i \in [0, 63] \wedge \left( T_{00}[i] \oplus E_{00}[i] \oplus \overline{M_{00}^+[i]} \oplus X_r[i] \right)$$

$$\forall i \in [0, 63] \bigwedge_{xx=1}^{24} \left( T_{MSM[xx][0]}[(i-MSS[xx][0])\%64] \oplus E_{xx}[i] \oplus \overline{M_{xx}^+[i]} \right)$$

$$\forall i \in [0, 63] \bigwedge_{xx=0}^{24} (T_{MSM[xx][1]}[(i-MSS[xx][1])\%64] \vee$$

$$\overline{T_{MSM[xx][2]}[(i-MSS[xx][2])\%64]} \vee E_{xx}[i])$$

$$\forall i \in [0, 63] \bigwedge_{xx=0}^{24} (\overline{T_{MSM[xx][1]}[(i-MSS[xx][1])\%64]} \vee \overline{E_{xx}[i]})$$

$$\forall i \in [0, 63] \bigwedge_{xx=0}^{24} (T_{MSM[xx][2]}[(i-MSS[xx][2])\%64] \vee \overline{E_{xx}[i]})$$

with the 25 internal states denoted $M_{xx}[i]$, $T_{xx}[i]$ an intermediate 64-bit word named "Theta", $E_{xx}[i]$ a 64-bit word named "equivalency", and r the round number.

The SAT encoding of the SHA-3 hash function according to the invention may comprise 869 120 clauses and 92 160 variables. These values may vary according to the implemented encoding technique.

Data Retrieval

During a previous connection to the server, the client has registered and entered a data to be preserved. This data may be the password needed for the authentication on the server, or any data the client wants to preserve, as for example administrative documents, bills, contracts, pictures, audios or videos, etc.

A secured connection is preferably established between the client and the server, as for example a SSL or TLS connection ("Secure Sockets Layer" or "Transport Layer Security").

A web application may allow the client to enter his information, preferably his e-mail address, account name and the password.

In the case where the data to be preserved is different from said password, the client may be invited to enter the data on a dedicated location of the web application.

The data to be preserved is advantageously hashed by the hash function HF, being preferably the SHA-3 hash function previously described, in order to generate the hashed word stored in the memory to which the server has access.

The memory may be an internal memory of the server or a remote one.

Storing a fingerprint of the data allows checking its integrity without knowing it, thanks to the one-way hash function. It may also be used algebraically to reconstruct the data when associated with a given security key of backhash information.

The processing function modifying the data to be preserved, in order to form input data of the predefined capacity $C_p$, may correspond to a concatenation with at least an initial sponge ISC.

The initial sponge may be randomly sampled, comprising for example only bits equal to 0.

In addition to being concatenated with said initial sponge, the data may be concatenated with a padding word, in order to reach the bitrate $r_b$ previously defined, corresponding to the difference between the predefined capacity $C_p$ and the initial sponge capacity c.

The hashed word $H_b$ may be expressed as:

$$H_b = HF(\text{Input1}) = HF(\text{Data}\|\text{Padding}\|\text{ISC}).$$

The processing functions used to modify the data for forming input data and generating the hashed word $H_b$ and the security key $H_c$ may be identical, the first Input1 and second Input2 input data being identical. The data to be preserved is therefore advantageously concatenated with a padding word, for reaching the bitrate $r_b$, and with an initial sponge of a capacity equal to c, in order to further generate the security key $H_c$ by hashing the result of the concatenation, having the predefined capacity $C_p$.

In order to generate the security key according to the invention, the hash function HF is advantageously modified to form the hash function HF*, configured to conserve all the bits of the last internal state computed from the data to be preserved as input of the hash function HF, and divide it into two parts, preferably by ignoring the compression function correlated to said hash function HF. Preferably, the hashed word corresponds to a 512-least significant bits vector of a 1600-bits internal state, and the security key corresponds to a 1088-least significant bits vector of a 1600-bits internal state.

The modified hash function HF* is configured to preserve all the standard specifications of hash function HF, but is also configured to compute any extra information that can lead to a security key allowing to reconstruct the clear text data when combined with the hashed word computed by hash function HF.

The generation of the security key $H_c$, illustrated in FIG. 4 for an internal state capacity of 1600 bits, may be expressed as:

$$H_c = HF^*(\text{Input2}) = HF^*(\text{Data}\|\text{Padding}\|\text{ISC}).$$

The capacity $C_{hc}$ of the security key $H_c$, also named the final sponge capacity, is equal to the difference between the predefined capacity $C_p$ and the capacity $C_{hb}$ of the hashed word $H_b$: $C_{hc} = C_p - C_{hb}$.

The client may generate the security key.

In this case, a dedicated software to retrieve the data may be proposed to the client. The client may download it and install it on the electronic machine he is using. While opening the software, a window may be displayed on the screen of the electronic machine the client is using, inviting the client to enter the data in a text area. The software may be configured to run the modified hash function to generate the security key. This offers a better security, because the security key does not need to be sent to the client by the server and thus the latter never knows it.

In a variant embodiment, the security key may be generated by the server and sent to the client, and not stored on the memory to which the server has access.

When the client has lost or forgotten his data, or wants to access it, he may send a request to the server for retrieving it. The client may enter his name and/or e-mail account on a page of a website that helps retrieving the lost data. An e-mail containing a link to a web application may be sent to the client, establishing a secured connection between the client and the server. Such an e-mail does not contain any sensitive information, and could be intercepted without compromising the security of the data.

The server may send to the client the hashed word, for example in an e-mail, so that the client concatenates said hashed word and the security key stored in a memory of the electronic machine he is using. By doing so, the client is advantageously able to rebuild a block of bits having the predefined capacity, corresponding to the last internal state computed from the data to be preserved as input of the hash function. The client may then compute the lost data. The software installed on the electronic machine the client is using may be configured to run the inverse hash function.

In a variant embodiment, the client sends the security key to the server, in order to concatenate it with the hashed word, so that the server computes the lost data.

Thanks to the algebraic solving of the hash function, the inverse hash function $HF^{*-1}$ applied to this concatenated sequence allows retrieving the complete input block, including the initial sponge capacity, and thus the lost data:

$$\text{Data}\|\text{Padding}\|\text{ISC} = HF^{*-1}(H_b\|H_c).$$

The retrieved data may be displayed on the screen of the electronic machine the client is using, or stored in the memory of said machine, especially in the case the data is a file. The retrieved data is advantageously not stored on the memory to which the server has access.

The electronic machine the client is using may be any dedicated device, for example a personal computer, a smartphone, a smart watch, a digital tablet or an integrated access device for Internet or television.

Computer Program Product

Another object of the invention is a computer program product comprising instructions that can be read by both a server and a client, these instructions controlling the operation of said server and client so that, for retrieving a data to be preserved, entered by the client during a previous connection to the server, the server having access to a memory comprising a hashed word generated by applying a hash function to a first input data of a predefined capacity, the first input data corresponding to the data to be preserved modified by a processing function, the capacity of the hashed word being lower than said predefined capacity, a security key of the client having been generated by applying a hash function to a second input data of a predefined capacity, the second input data corresponding to the data to be preserved modified by a processing function, the capacity of the security key being equal to the difference between said predefined capacity and the capacity of the hashed word, the security key not being stored on the memory to which the server has access:

after a request of the client to retrieve the data to be preserved, the hashed word and the security key are concatenated in order to reach said predefined capacity, and an inverse hash function, using an algebraic solving of the hash function having generated the hashed word, is applied to the concatenation of said hashed word and security key, in order to retrieve the data to be preserved.

All of the features defined for the method for retrieving a data to be preserved apply to the computer program product.

DETAILED DESCRIPTION

The invention will be better understood on reading the following detailed description of non-limiting exemplary embodiments thereof and on examining the appended drawings in which:

FIG. 1A, previously described, illustrates a general framework for the registration of a client on a server using a state-of-the-art method;

FIG. 1B, previously described, illustrates a general framework for the authentication of a client on a server;

FIG. 2, previously described, illustrates a general framework for the retrieval of a lost password according to the state-of-the-art;

FIG. 3, previously described, is a hashing process of an input sequence using the SHA-3 function;

FIG. 4, previously described, illustrates the generation of the security key according to the invention;

Figure 1A:
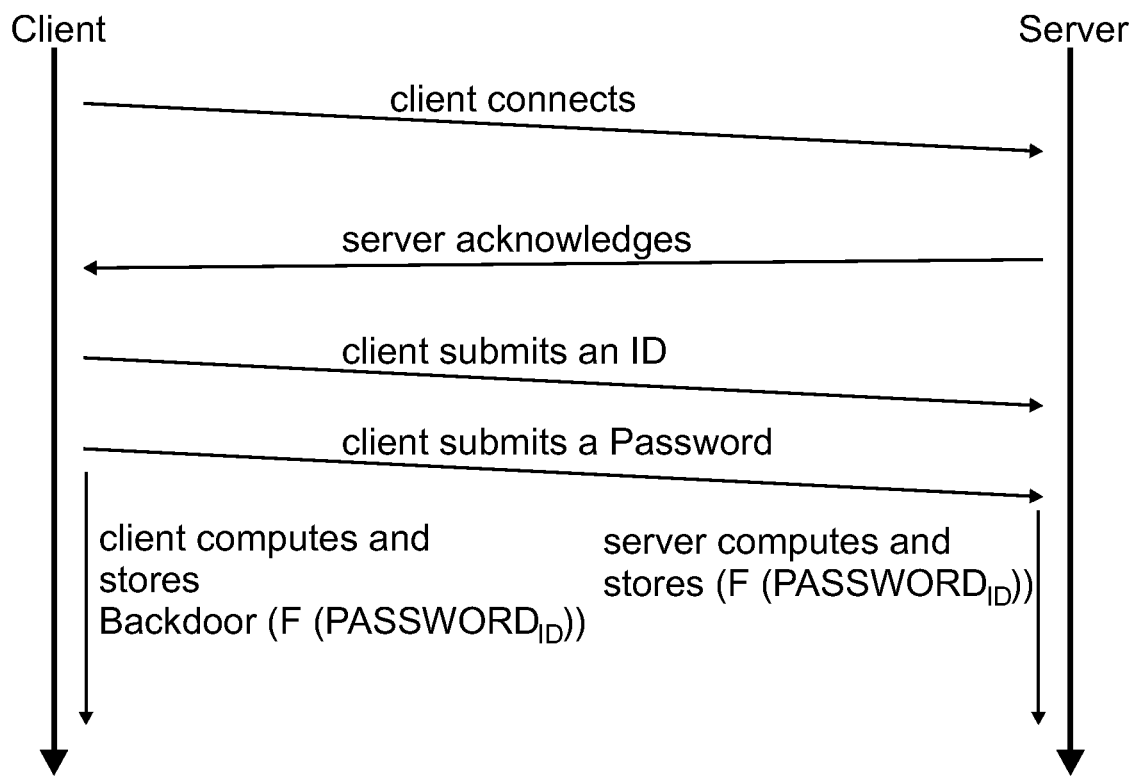
Figure 1B:
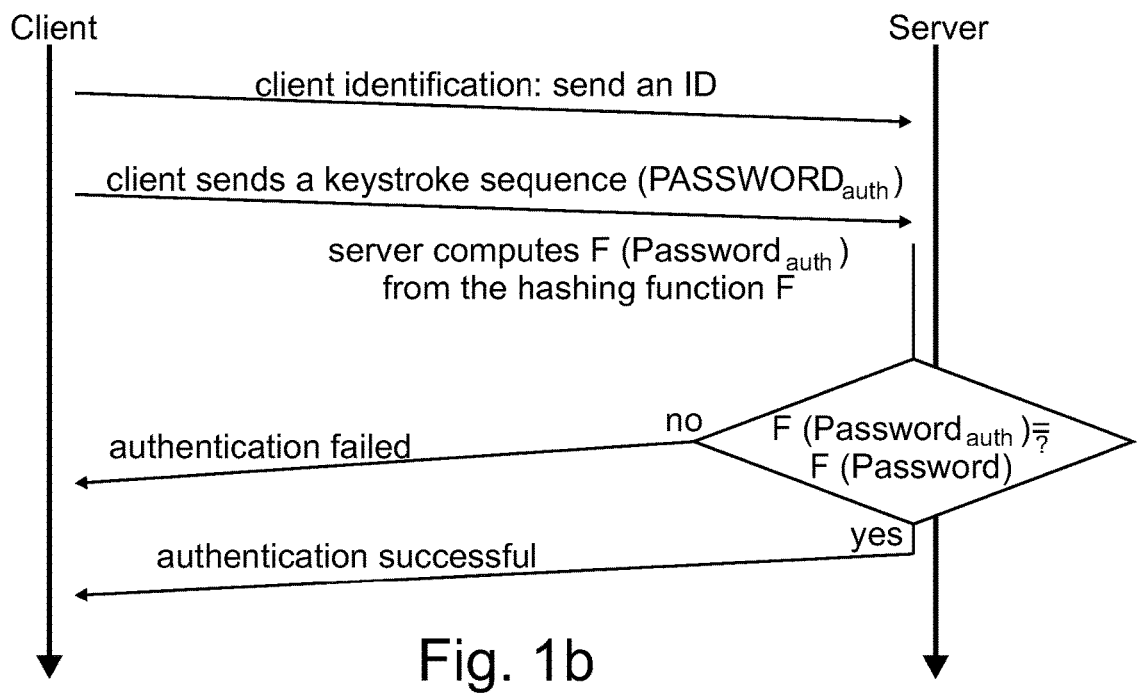
Figure 2:
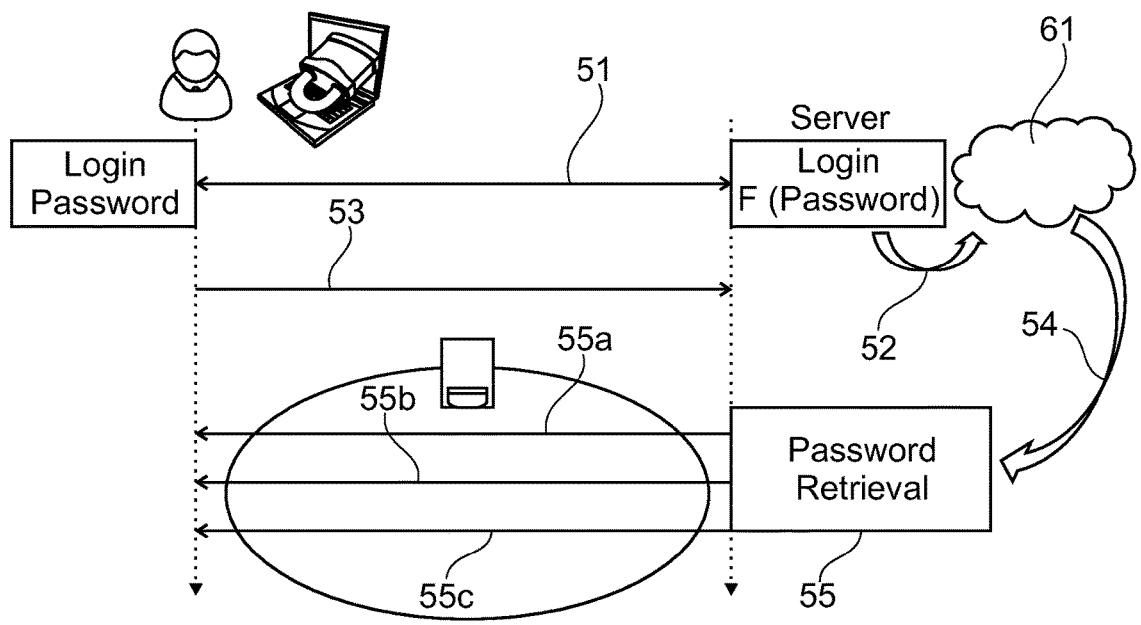
Figure 3:
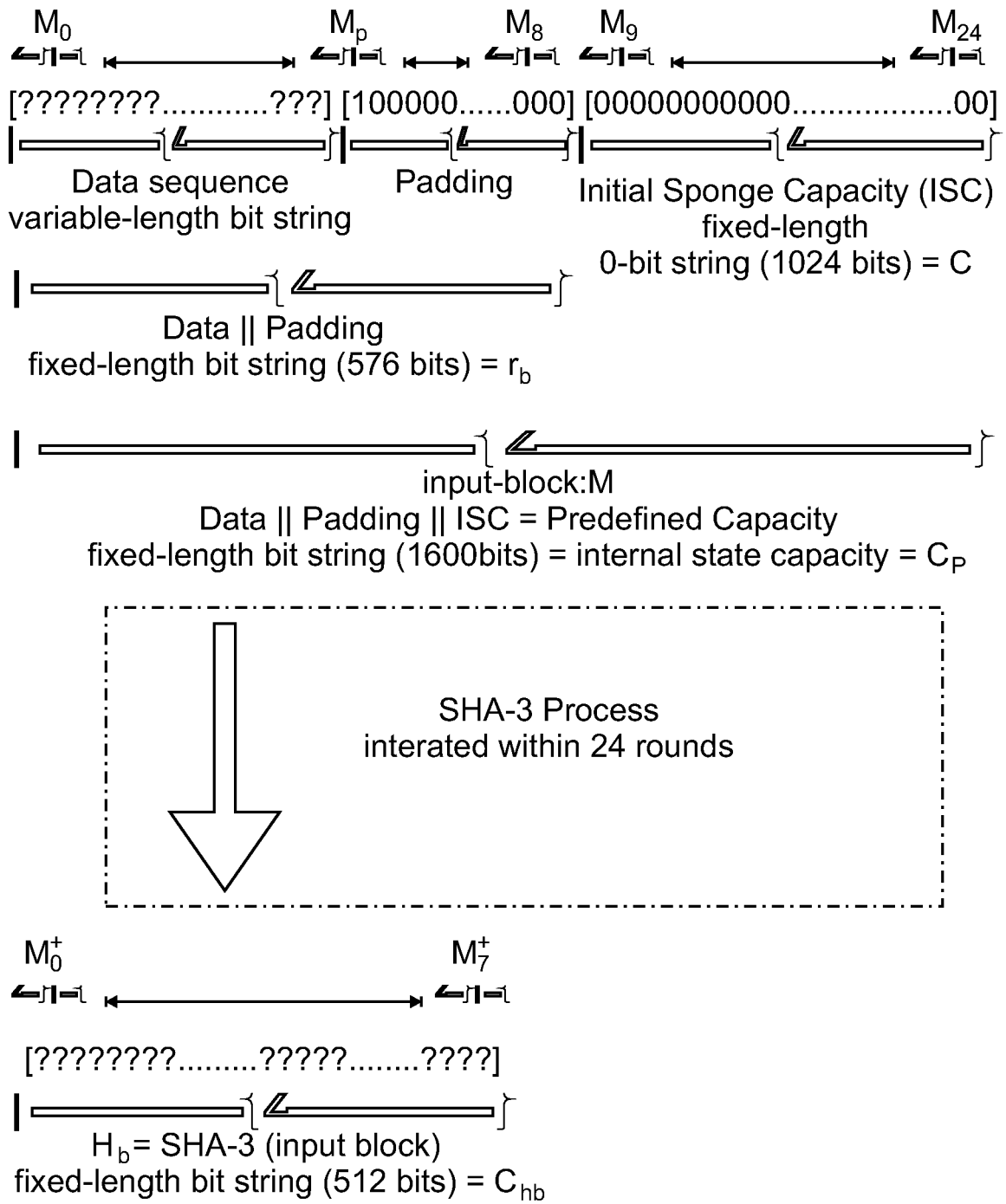
Figure 4:
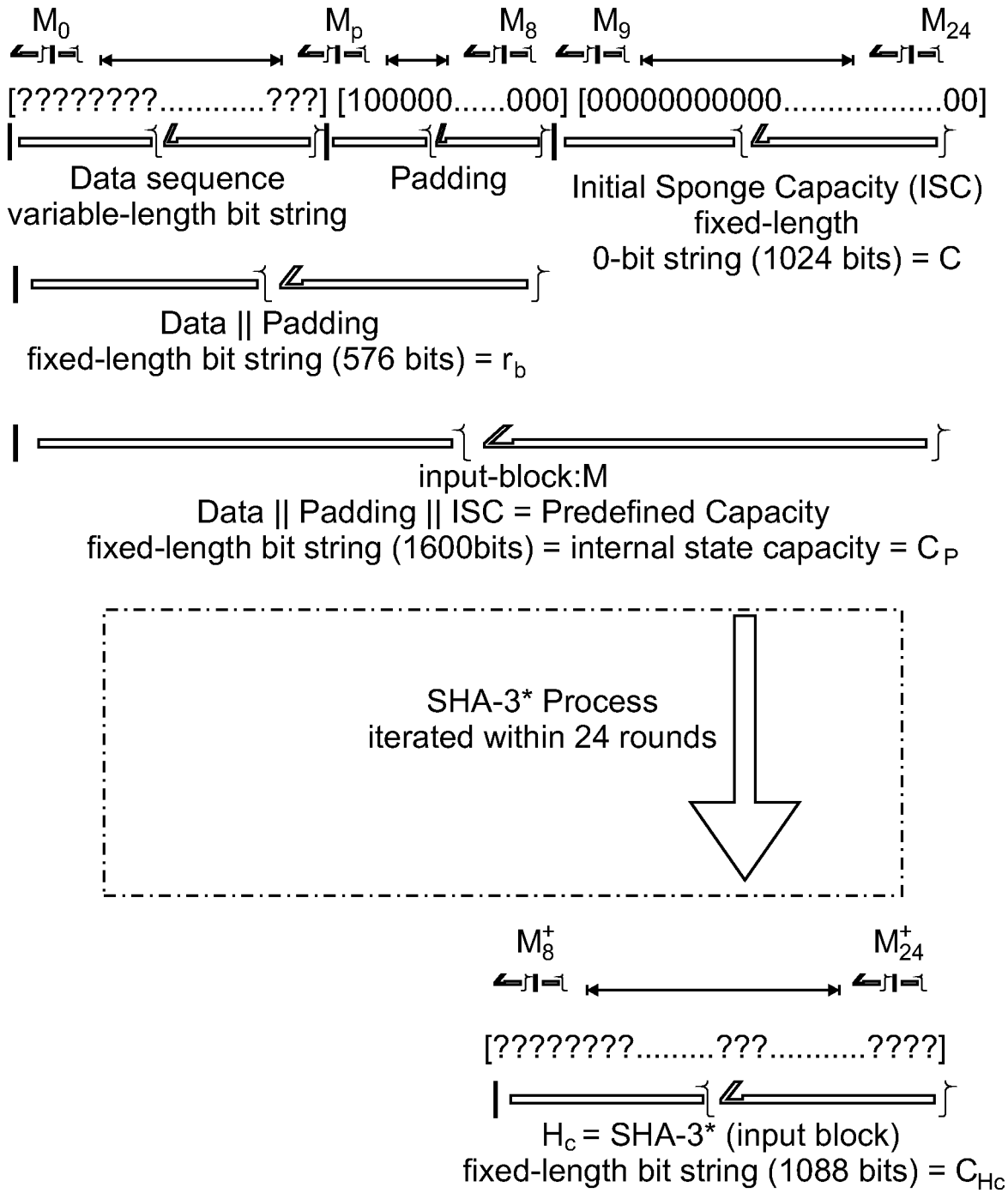
Figure 5:
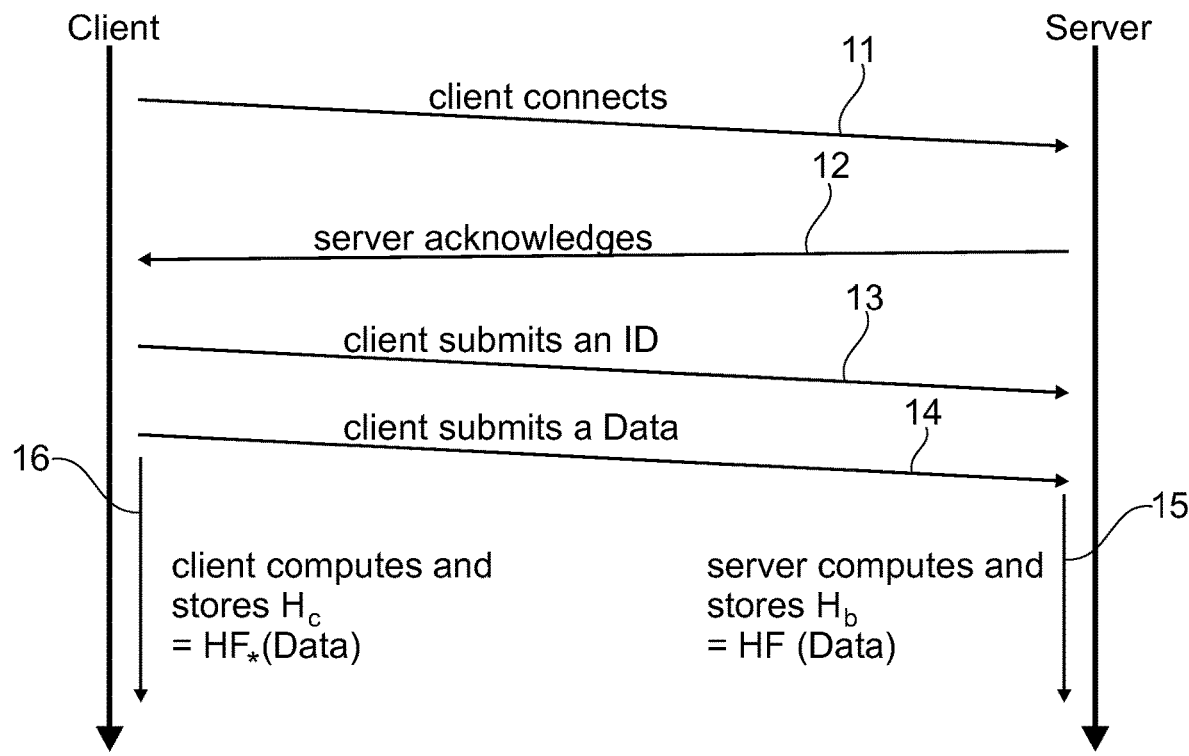
FIG. 5 illustrates the registration of a client on a server implying a security key according to the invention.

The registration of a client on a server implying a security key according to the invention is shown in FIG. 5.

At a step 11, the client connects to the server, by using preferably a secured connection. The server acknowledges the client at a step 12, and the client enters a login ID and a Data to be preserved, at steps 13 and 14. The Data to be preserved may be a password used for the authentication of the client on the server, or any other data he wants to preserve.

At a step 15, the server generates a hashed word $H_b$ by applying a hash function HF to a first input data Input1, corresponding to the Data to be preserved modified by a processing function in order to reach a predefined capacity $C_p$. As previously explained, in order to form the input data Input1, Data is advantageously concatenated with a Padding word comprising one or several bits, and with an initial sponge ISC, having an initial sponge capacity c. The number of bits of the Padding word is chosen such as reaching a bitrate $r_b$ corresponding to the difference between the predefined capacity $C_p$ and the initial sponge capacity c.

$$H_b = HF(\text{Data} \| \text{Padding} \| ISC).$$

At a step 16, in the illustrated example, the client generates a security key $H_c$ by applying the modified hash function HF* to a second input data Input2, corresponding to the Data to be preserved modified by the processing function:

$$H_c = HF^*(\text{Data} \| \text{Padding} \| ISC).$$

The first and second input data Input1 and Input2 are advantageously identical.

The capacity $C_{hc}$ of the security key $H_c$ is equal to the difference between the predefined capacity $C_p$ and the capacity $C_{hb}$ of the hashed word $H_b$: $C_{hc} = C_p - C_{hb}$.

In the illustrated embodiment, the hash function HF* is a SHA-3 hash function, using the Keccak algorithm, and modified such as conserving all the bits of the last internal state computed from the Data to be preserved as input of the hash function SHA-3, and divide it into two parts.

The predefined capacity $C_p$ is for example equal to 1600 bits, the capacity of the data being equal to 576 bits and thus the capacity c of the initial sponge being equal to 1024 bits, the capacity $C_{hb}$ of the hashed word is equal to 512 bits, and the one $C_{hc}$ of the security key is equal to 1088 bits.

Figure 6:
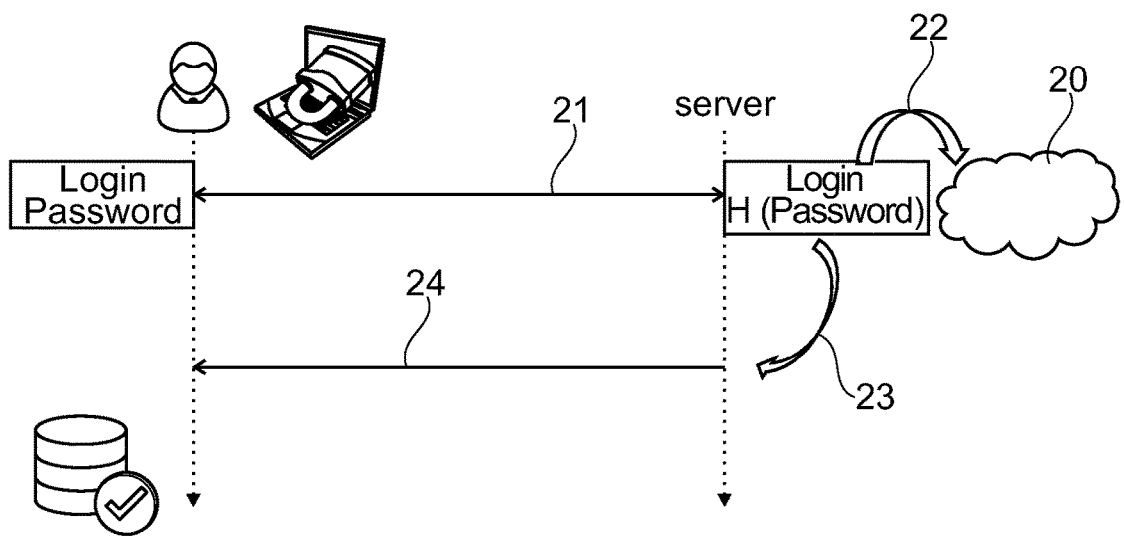
FIG. 6 illustrates a variant of the registration of a client on a server according to the invention.

In the variant embodiment shown at FIG. 6, the security key $H_c$ is generated on the server, at a step 23, and sent to the client, at a step 24, and not stored on a memory 20 to which the server has access. The password entered by a client at a step 21 of registration is hashed, as previously described, and stored, at a step 22, in the memory 20 to which the server has access.

Figure 7:
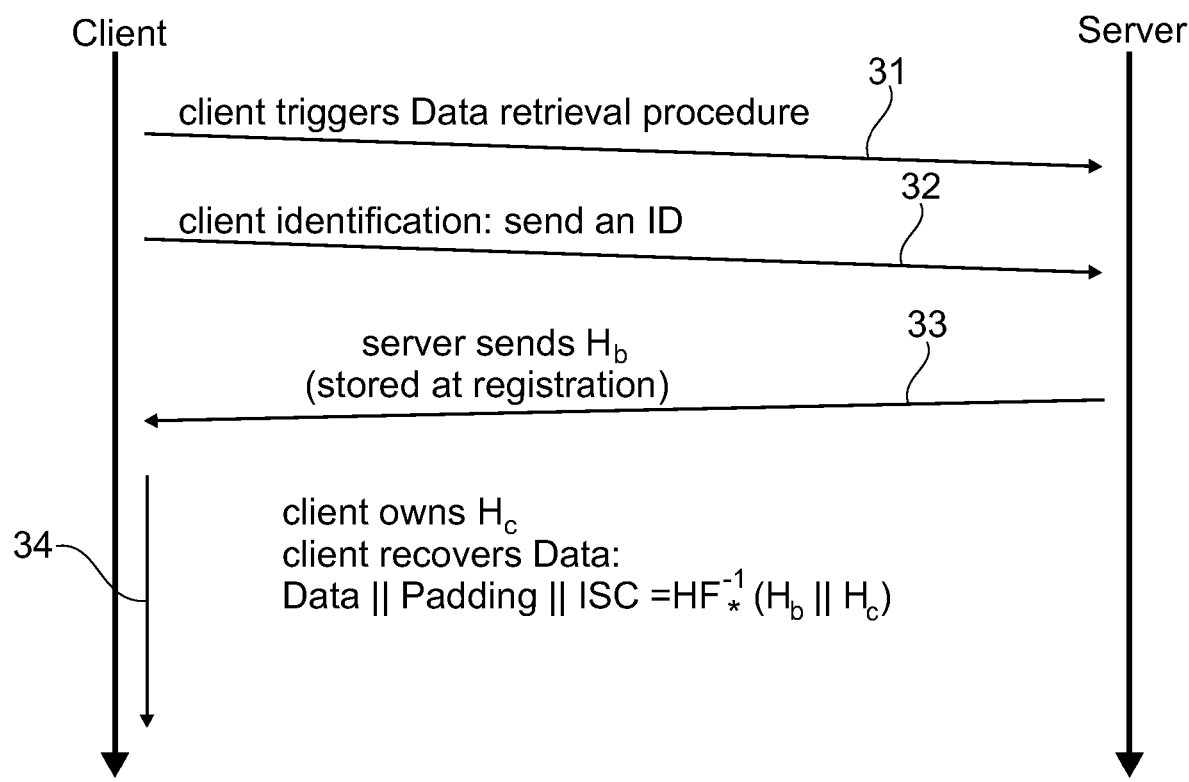
FIG. 7 illustrates a general framework for the retrieval of a lost data according to the invention.

FIG. 7 illustrates the main steps of an example for the retrieval of a lost data according to the invention.

After a request of the client to retrieve the Data to be preserved, at a step 31, and his identification, at a step 32, by sending his login ID, the server sends to the client the hashed word $H_b$, at a step 33, so that the client concatenates said hashed word and the security key $H_c$ stored in a memory of the electronic machine he is using in order to reach said predefined capacity $C_p$.

As previously described, at a step 34, an inverse hash function $HF^{*-1}$, using an algebraic solving of the hash function HF*, is applied to the concatenation of said hashed word $H_b$ and security key $H_c$, in order to retrieve the Data to be preserved:

$$\text{Data} \| \text{Padding} \| ISC = HF^{*-1}(H_b \| H_c).$$

In a variant embodiment, not shown, the client sends the security key $H_c$ to the server, so that the latter can concatenate it with the hashed word $H_b$ in order to retrieve Data.

Especially in the embodiment where the client generates the security key $H_c$ and applies the inverse hash function $HF^{*-1}$, a dedicated software to retrieve the data is advantageously proposed to the client, who downloads it and installs it on the electronic machine he is using, the software being configured to run the modified hash function HF* to generate the security key H and the inverse hash function $HF^{*-1}$.

As previously explained, the algebraic solving of the hash function HF* is advantageously a SATisfiability solving.

Runtimes for SATisfiability solving of the SHA-3* hashing part of the data retrieval protocol according to the invention may lie between 7 seconds to 56 seconds, better between 9 seconds to 15 seconds, being equal for example to nearly 10 seconds.

The invention is not limited to the examples that have just been described. In particular, features from the embodiments illustrated may be combined within embodiments that are not illustrated.

Other algebraic solving than SATisfiability solving may be used, as for example automated reasoning techniques, meta-heuristics, finite algebra solving techniques, or Gröbner bases.

The method for retrieving a data to be preserved according to the invention and as defined above may be used in order to avoid the circulation of clear text passwords on a network. When a client logs in, he enters his password, which is sent in clear text to the provider's server through the network. This could be avoided by computing, on the client side, the security key, also named "backhash" or, in this application, "shadow password", and sending it on the network to the server so it can compare it to the hashed password and check the security key.

The invention may be used as well to reinforce cloud security by delegating credentials. When a node, especially in cloud computing, starts a job on the behalf of a client on other nodes, it does it without any credential. To avoid this security hole, each node could send security keys according to the invention to start jobs on other nodes and authenticate the client. The operation of login happens only on the first node and is done by the client.

In military applications, by keeping all the security keys on a server, Intelligence Services (IS) could have access to every password without storing critical data: the hashed passwords are kept only on the servers of the providers. The "backhash" generation could be imposed by law to all providers for each new account. This way, no one but IS can know the clear text passwords of everybody.

The method according to the invention may be implemented in an integrated access device for Internet or television, especially in order to retrieve preserved content in a decoder of video flow for pay-per-view channels.

The security key and/or the hashed word may also be considered as data to be preserved, and may benefit from the method according to the invention for their own security, and thus be stored on several servers. More the consensus «server(s)+client» involves different actors, better the security is.

The method according to the invention between a server and a client to offer a secured solution for retrieving a data to be preserved may be extended to a consensus between several servers and one or several clients, further reinforcing the security.

In this case, the method according to the invention has to be replicated between the different servers. For example with two servers srv1, srv2 and one client, the latter owns at the end $\{H_{c0}, ID, IDsrv1\}$, the first server srv1 owns $\{H_{c1}(H_{c0}), ID', IDsrv2\}$ and the second server srv2 owns $\{H_{b2}, ID'\}$, $H_{c1}(H_{c0})$ being an intermediate security key generated by applying the hash function to the security key $H_{c0}$.

The data may be retrieved if the first server srv1, thanks to a consensus with the second server srv2, realizes:

$$H_{b1}\|Padding\|ISC1=HF^{*-1}(H_{b2}\|H_{c1}(H_{c0})),$$

and if the client, thanks to a consensus with the first server srv1, realizes:

$$Data\|Padding\|ISC0=HF^{*-1}(H_{b1}\|H_{c0})\cdot Password+Padding+ISC=SHA\text{-}3^{-1}(HID+FSCID)$$

On this basis, the invention may allow reinforcing the security of applications of «digital safe», corresponding to the storing and indexing of sensitive digital data, as administrative documents, bills, contracts, pictures etc. Thanks to the invention, with only one password, the client may retrieve all the connection data he needs to access said sensitive data, by storing none of these connection data and without needing to trust an online service.

The invention may be used to build an authentication service fully centralized, managed by only one password, no sensitive information being stored anywhere.

Thanks to this technique, the invention may allow offering services of certification of the different Web sites the client is using, by providing a solution against Phishing attacks, that is to say attacks aiming to steal the identity of a client by collecting personal information.

Thanks to the invention, weak passwords, as for example «azerty», «12345» or «00000», may be authorized and used without any risks.

The method according to the invention is secured if the client uses only one electronic machine to access the services using said method. In the case where the client uses different electronic machines, a transmission protocol may be used, especially by copying the local information, that is to say the security keys, from one machine to another.

The expression "comprising a" or "including a" must be understood as being synonymous with "comprising at least one" or "including at least one", unless specified otherwise.

The invention claimed is:

1. Method for retrieving a data to be preserved, entered by a client during a previous connection to a server, the server having access to a memory comprising a hashed word generated by applying a hash function to a first input data of a predefined capacity, the first input data corresponding to the data to be preserved modified by a processing function, the capacity of the hashed word being lower than said predefined capacity, the hash function having generated the hashed word being modified to form a modified hash function, said modified hash function being configured to conserve all the bits of the last internal state computed from the data to be preserved as input of the hash function having generated the hashed word, and to divide said last internal state into two parts, a security key of the client having been generated by applying said modified hash function to a second input data of a predefined capacity, the second input data corresponding to the data to be preserved modified by a processing function, the capacity of the security key being equal to the difference between said predefined capacity and the capacity of the hashed word, the security key not being stored on the memory to which the server has access, method wherein:

after a request of the client to retrieve the data to be preserved, the hashed word and the security key are concatenated in order to reach said predefined capacity, and an inverse hash function, using an algebraic solving of the hash function having generated the hashed word, is applied to the concatenation of said hashed word and security key, in order to retrieve the data to be preserved.

2. Method according to claim 1, wherein the hash function is a SHA-3 hash function, especially using the Keccak algorithm.

3. Method according to claim 1, wherein the algebraic solving of the hash function is a SATisfiability solving.

4. Method according to claim 1, wherein the processing function modifying the data to be preserved, in order to form input data of the predefined capacity, corresponds to a concatenation of the data to be preserved with at least an initial sponge.

5. Method according to claim 4, wherein in addition to being concatenated with said initial sponge, the data to be preserved is concatenated with a padding word, in order to reach a bitrate corresponding to the difference between the predefined capacity and the capacity of the initial sponge.

6. Method according to claim 1, wherein the processing function used to modify the first input data and the processing function used to modify the second input data for forming the input data and generating the hashed word and the security key are identical, said first input data and second input data being identical.

7. Method according to claim 1, wherein the client generates the security key.

8. Method according to claim 7, wherein the server sends to the client the hashed word, so that the client concatenates said hashed word and the security key stored in a memory of the electronic machine said client is using.

9. Method according to claim 8, wherein a dedicated software to retrieve the data to be preserved is proposed to the client, who downloads it and installs it on the electronic machine said client is using, the software being configured to run the modified hash function used to generate the security key and the inverse hash function.

10. Method according to claim 1, wherein the security key is generated on the server and sent to the client, and not stored on the memory to which the server has access.

11. Method according to claim 10, wherein the client sends the security key to the server, in order for the server to concatenate the security key with the hashed word.

12. Method according to claim 1, wherein the predefined capacity is equal to 1600 bits, the capacity of the initial sponge being equal to 1024 bits, the capacity of the hashed word is equal to 512 bits, and the one of the security key is equal to 1088 bits.

13. A non-transitory computer readable medium comprising computer program instructions able to be read by both a server and a client and that, when executed by a processor, cause the processor to control the operation of said server and client so that, for retrieving a data to be preserved, entered by the client during a previous connection to the server, the server having access to a memory comprising a hashed word generated by applying a hash function to a first input data of a predefined capacity, the first input data corresponding to the data to be preserved modified by a processing function, the capacity of the hashed word being lower than said predefined capacity, the hash function being modified to form a modified hash function said modified hash function being configured to conserve all the bits of the last internal state computed from the data to be preserved as input of the hash function having generated the hashed word, and to divide said last internal state into two parts, a security key of the client having been generated by applying a hash function to a second input data of a predefined capacity, the second input data corresponding to the data to be preserved modified by a processing function, the capacity of the security key being equal to the difference between said predefined capacity and the capacity of the hashed word, the security key not being stored on the memory to which the server has access:

after a request of the client to retrieve the data to be preserved, the hashed word and the security key are concatenated in order to reach said predefined capacity, and an inverse hash function, using an algebraic solving of the hash function having generated the hashed word, is applied to the concatenation of said hashed word and security key, in order to retrieve the data to be preserved.

14. A non-transitory computer readable medium according to claim 13, wherein, the client having generated the security key, the server sends to the client the hashed word, so that the client concatenates said hashed word and the security key stored in a memory of the electronic machine said client is using.

15. A non-transitory computer readable medium according to claim 13, wherein, the security key having been generated on the server, sent to the client, and not stored on the memory to which the server has access, the client sends the security key to the server, in order for the server to concatenate the security key with the hashed word.

* * * * *